United States Patent
Kikuchi (10) Patent No.: US 8,385,734 B2
(45) Date of Patent: Feb. 26, 2013

(54) FOCUS CONTROL APPARATUS AND FOCUS CONTROL METHOD

(75) Inventor: Tetsuo Kikuchi, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 11 days.

(21) Appl. No.: 13/032,928

(22) Filed: Feb. 23, 2011

(65) Prior Publication Data

US 2011/0211822 A1    Sep. 1, 2011

(30) Foreign Application Priority Data

Feb. 26, 2010    (JP) ................. 2010-042573

(51) Int. Cl.
*G03B 3/00* (2006.01)
*G03B 13/00* (2006.01)

(52) U.S. Cl. .......... 396/125; 396/90; 348/345; 348/357
(58) Field of Classification Search .............. 396/89, 396/90, 125; 348/345, 357
See application file for complete search history.

(56) References Cited

U.S. PATENT DOCUMENTS

| | | | | |
|---|---|---|---|---|
| 4,578,571 A | * | 3/1986 | Williams | 235/462.25 |
| 7,355,175 B2 | * | 4/2008 | Honda et al. | 250/310 |
| 2008/0049145 A1 | * | 2/2008 | Yokoyama et al. | 348/699 |
| 2009/0116830 A1 | * | 5/2009 | Kumagai | 396/125 |
| 2010/0046085 A1 | * | 2/2010 | Yumiki et al. | 359/684 |

FOREIGN PATENT DOCUMENTS

JP    10-322583    12/1998

* cited by examiner

*Primary Examiner* — Clayton E Laballe
*Assistant Examiner* — Warren K Fenwick
(74) *Attorney, Agent, or Firm* — John C. Pokotylo; Straub & Pokotylo (57) ABSTRACT

A focus control apparatus for use in an imaging apparatus includes an exchangeable lens and a camera body. The exchangeable lens includes an optical system including a focus lens. The camera body is able to hold the exchangeable lens and includes an imaging element. The apparatus further includes a pan•tilt detection unit, a decision unit, and a control unit. The pan•tilt detection unit detects a pan and tilt of the camera body. The decision unit determines whether the exchangeable lens is able to achieve wobbling. The control unit controls an automatic focusing process of the focus lens in accordance with an image data generated by the imaging element. The control unit executes a different automatic focusing process in accordance with a decision made by the decision unit, when the pan or tilt of the camera body is detected to have started.

19 Claims, 7 Drawing Sheets

FOCUS CONTROL APPARATUS AND FOCUS CONTROL METHOD

CROSS-REFERENCE TO RELATED APPLICATIONS

This application is based upon and claims the benefit of priority from prior Japanese Patent Application No. 2010-042573, filed Feb. 26, 2010, the entire contents of which are incorporated herein by reference.

BACKGROUND OF THE INVENTION

1. Field of the Invention

The invention relates to a focus control apparatus for use in imaging apparatuses having an exchangeable lens and a camera body. More particularly, the invention relates to a focus control apparatus and a focus control method, both designed to execute focus control by using a so-called hill-climbing method.

2. Description of the Related Art

Various techniques of achieving an accurate and high-speed automatic focus control have hitherto been proposed. Such a technique is disclosed in Jpn. Pat. Appln. KOKAI Publication No. 10-322583. This technique is to interrupt the focus control of the hill-climbing method (hereinafter referred to as "hill-climbing AF") for a predetermined time when the product of the angular velocity change of a lens unit and the focal distance exceeds a prescribed threshold value. The hill-climbing AF is achieved, first by detecting the contrast of the image acquired by an imaging element while moving the focus lens along the optical axis thereof, and then by detecting the focal position of the focus lens in accordance with the change in the contrast. If the technique disclosed in Jpn. Pat. Appln. KOKAI Publication No. 10-322583 is utilized, the hill-climbing AF will be interrupted whenever a motion of the camera, including a pan, occurs. While the hill-climbing AF remains so interrupted, the focus control would not become unstable.

BRIEF SUMMARY OF THE INVENTION

According to a first aspect of the invention, there is provided a focus control apparatus for use in an imaging apparatus comprising an exchangeable lens and a camera body, the exchangeable lens including an optical system including a focus lens capable of moving in an optical axis and configured to generate an optical image of an object, and the camera body being able to hold the exchangeable lens and including an imaging element configured to generate an image data from the optical image generated by the optical system, the apparatus comprising: a pan•tilt detection unit configured to detect a pan and tilt of the camera body; a decision unit configured to determine whether the exchangeable lens is able to achieve wobbling; and a control unit configured to control an automatic focusing process of moving the focus lens to achieve focus control with respect to the object, in accordance with the image data generated by the imaging element, and to execute a different automatic focusing process in accordance with a decision made by the decision unit, when the pan or tilt of the camera body is detected to have started.

According to a second aspect of the invention, there is provided a focus control apparatus for use in an imaging apparatus comprising an exchangeable lens and a camera body, the exchangeable lens including an optical system including a focus lens capable of moving in an optical axis and configured to generate an optical image of an object, and the camera body being able to hold the exchangeable lens and including an imaging element configured to generate image data from the optical image generated by the optical system, the apparatus comprising: a pan•tilt detection unit configured to detect a pan and tilt of the camera body; a decision unit configured to determine whether the exchangeable lens is able to achieve wobbling; and a control unit configured to control an automatic focusing process of moving the focus lens to achieve focus control with respect to the object, in accordance with the image data generated by the imaging element, and to execute a different automatic focusing process in accordance with a decision made by the decision unit, when the pan or tilt of the camera body is detected to have started while the focus lens is moving.

According to a third aspect of the invention, there is provided a focus control method for use in an imaging apparatus comprising an exchangeable lens and a camera body, the exchangeable lens including an optical system including a focus lens capable of moving in an optical axis and configured to generate an optical image of an object, and the camera body being able to hold the exchangeable lens and including an imaging element configured to generate image data from the optical image generated by the optical system, the method comprising: detecting a pan and tilt of the camera body; determining whether the exchangeable lens is able to achieve wobbling; and executing a different automatic focusing process in accordance with whether the exchangeable lens is able to execute wobbling when the pan or tilt of the camera body is detected to have started.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Various embodiments will be described hereinafter with reference to the accompanying drawings.

Figure 1:
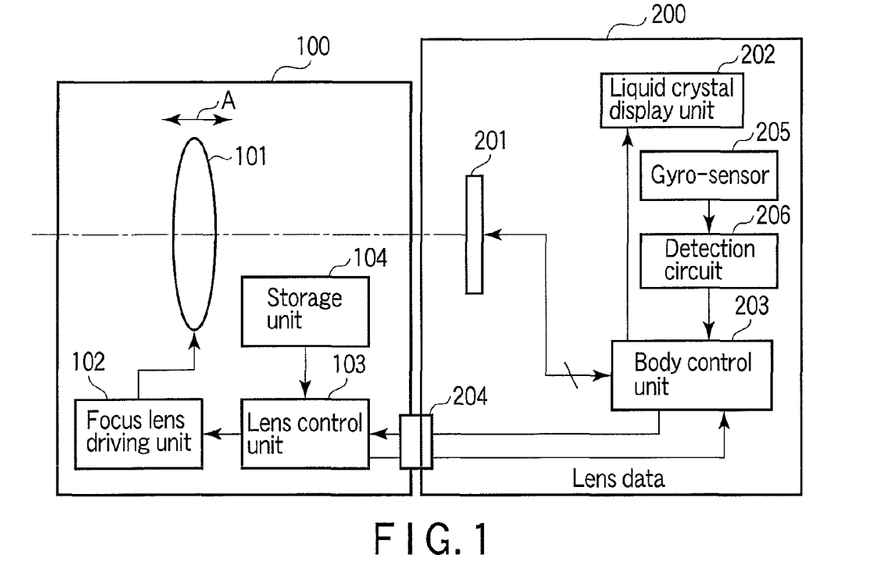
FIG. 1 is a diagram showing the configuration of an imaging apparatus including a focus control apparatus according to an embodiment of the invention.

FIG. 1 is a block diagram showing the configuration of an imaging apparatus including a focus control apparatus according to an embodiment of the invention. The imaging apparatus of FIG. 1 includes an exchangeable lens 100 and a camera body 200. In the imaging apparatus, the exchangeable lens 100 can be detachably attached to a lens mount (not shown), which is provided on the camera body 200.

The exchangeable lens 100 includes an imaging lens 101, a focus lens driving unit 102, a lens control unit 103, and a storage unit 104. The exchangeable lens 100 further includes an aperture mechanism, a zoom mechanism and the like, which are not shown in FIG. 1.

The imaging lens 101 is an optical system that includes a focus lens, and configured to form an optical image of an object (not shown) on the imaging element 201 provided in the camera body 200. The focus lens driving unit 102 includes a drive mechanism such as a motor (focus motor). The focus lens driving unit 102 is configured to move the focus lens along the optical axis thereof (or in the directions of arrow A), in accordance with a control signal supplied from the lens control unit 103.

The lens control unit 103 is an LSI including a microcomputer and a control circuit, which are integrated together. The control circuit controls the components provided in the exchangeable lens 100. The lens control unit 103 supplies a control signal to the driving unit 102, in accordance with a control signal output from a body control unit 203 incorporated in the camera body 200. The lens control unit 103 receives a sync signal supplied from the body control unit 203. On the basis of the sync signal and the data representing the phase of the sync signal, the lens control unit 103 executes focus control including a process of wobbling the focus lens. The focus control will be described later in detail.

The storage unit 104 stores the characteristic data about the exchangeable lens 100. The lens control unit 103 transmits the characteristic data stored in the storage unit 104 to the body control unit 203, in response to the request the body control unit 203 has made.

As sated above, the lens control unit 103 is an LSI including a microcomputer and a control circuit, which are integrated together. Nonetheless, the microcomputer and the control circuit need not be integrated together. Rather, they may be individual LSIs.

The camera body 200 includes an imaging element 201, a liquid crystal display unit 202, a mount contact 204, a gyro-sensor 205, and a detection circuit 206, in addition to the body control unit 203. The camera body 200 further includes a release button, a storage unit and the like, which are not shown in FIG. 1. The user may push the release button, causing the camera body 200 to take a picture. The storage unit stores the image data which the imaging element 201 generates when the release button is pushed.

The imaging element 201 receives an optical image coming through the exchangeable lens 100 and converts the optical image to an electric signal (image signal). The imaging element 201 includes a CCD image sensor, an MOS image sensor, or the like. From the image signal output from the imaging element 201, an AF evaluation value can be calculated, which shows the contrast of the image formed by the imaging element 201. From the AF evaluation value, the focus state of the imaging lens 101 can be detected.

The liquid crystal display unit 202 is provided on, for example, the back of the camera body 200. The liquid crystal display unit 202 displays the image represented by the image data which the body control unit 203 has generated from the image signal output from the imaging element 201.

The body control unit 203 is an LSI including a CPU, a control circuit, and a signal processing circuit, which are integrated together. The control circuit controls the components provided in the camera body 200. The signal processing circuit executes various signal processes. The body control unit 203 controls the components of the camera body 200, executing an operating sequence. The body control unit 203 outputs a control signal and a sync signal VD to the lens control unit 103 through the lens mount. The sync signal VD causes the imaging element 201 to achieve exposure in synchronism with the driving of the focus lens. Moreover, the body control unit 203 controls the imaging element 201 and converts the image signal output from the imaging element 201, converting the signal to image data that is a digital signal. In this case, the body control unit 203 executes various processes on the signal, such as white balance control. Moreover, the body control unit 203 outputs the image data acquired in the various processes executed on the signal, to the liquid crystal display unit 202. Then, the body control unit 203 controls the liquid crystal display unit 202 to display an image.

As described above, the body control unit 203 is an LSI including a microcomputer, a control circuit for controlling the components of the camera body 200, and the signal processing circuit for executing various signal processes, which are integrated together. Nonetheless, the microcomputer, the control circuit and the signal processing circuit need not be integrated together. Rather, they may be individual LSIs.

The mount contact 204 is provided in the lens mount, to connect the lens control unit 103 to the body control unit 203 so that the units 103 and 203 may communicate with each other.

The gyro-sensor 205 generates a signal that accords with angular velocity with respect to two axes. Assume that the camera body 200 takes a horizontal position. Then, two axes parallel and perpendicular to the ground, respectively, will be hereinafter referred to "X axis" and "Y axis." The gyro-sensor 205 is designed to detect the angular velocity with which the camera body 200 moves along the X and Y axes so defined. The detection circuit 206 executes a filtering process (differential process), or the like, on the signal output from the gyro-sensor 205. The signal so processed is supplied to the body control unit 203. The body control unit 203 determines, from the output of the detection circuit 206, whether the camera body 200 has been panned or tilted. That is, pan is detected if the camera body 200 moves parallel to the ground, and tilt is detected if the camera body 200 moves perpendicular to the ground. Thus, the gyro-sensor 205 and the detection circuit 206 function as a pan•tilt detection unit.

A method will be explained, in which the body control unit 203 executes a wobbling enable/disable determination process. "Wobbling" is a process of gradually moving the focus lens to its focal position, while vibrating the focus lens along the optical axis of the focus lens. Whether the wobbling can be executed or not is determined, in most cases, from the performance of the focus motor or the characteristic of lenses provided in the exchangeable lens 100. Usually, the focus lens needs to be vibrated along its optical axis, at a frequency (known as "wobbling frequency") of about 15 Hz to 30 Hz while wobbling. Hence, whether the wobbling is possible or not is determined in accordance with whether the exchangeable lens 100 includes a focus motor that can vibrate the focus lens at a frequency ranging from about 15 Hz to about 30 Hz or has a focus lens light enough to vibrate at such a relatively high frequency. Since the view angle minutely changes as the focus lens is moved along its optical axis, the lenses of the exchangeable lens 100 needs to be designed to prevent, as much as possible, the change in view angle.

Assume that the "exchangeable lens capable of wobbling" is designed to satisfy above mentioned requirement in this embodiment. Wobbling enable/disable data representing whether the exchangeable lens 100 can execute wobbling is stored in the storage unit 104 provided in the exchangeable lens 100. It is desired that the wobbling should be executed in synchronism with the exposure of the imaging element 201. Therefore, such wobbling enable/disable data as shown in Table 1 set forth below is stored in the storage unit 104 in this embodiment.

TABLE 1

Wobbling enable/disable data

| | Wobbling frequency | | | |
|---|---|---|---|---|
| | 15 Hz | 30 Hz | 60 Hz | 120 Hz |
| Enable/disable data | 1 | 1 | 0 | 0 |

In Table 1, "1" indicates that wobbling can be executed, and "0" indicates that wobbling cannot be executed.

Figure 2:
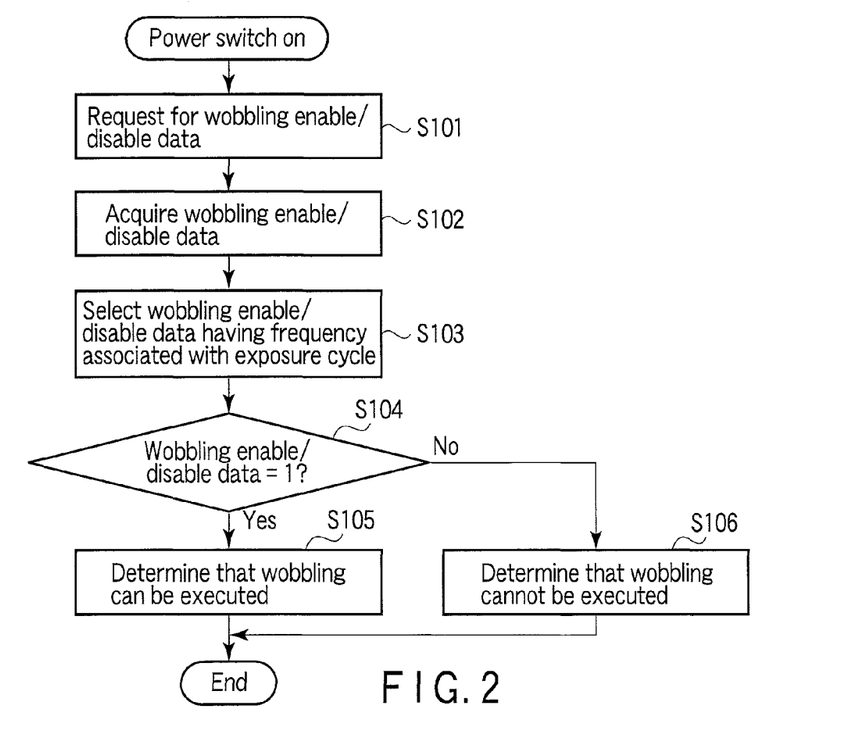
FIG. 2 is a flowchart showing a wobbling enable/disable determination process.

How the body control unit 203 executes the wobbling enable/disable determining process will be explained in detail with reference to FIG. 2.

When the power switch of the camera body 200 is turned on, the body control unit 203 transmits a command to the lens control unit 103, requesting for wobbling enable/disable data (Step S101). The transmission of the command is accomplished by means of a synchronous communication protocol using, for example, serial communication.

The lens control unit 103 decodes the command received from the camera body 200. If the command decoded is one requesting for the wobbling enable/disable data, the lens control unit 103 transmits the wobbling enable/disable data to the body control unit 203. Thus, the body control unit 203 acquires the wobbling enable/disable data (Step S102). On receiving the wobbling enable/disable data, the body control unit 203 selects wobbling enable/disable data associated with the exposure cycle prescribed for the imaging element 201 (Step S103). No wobbling enable/disable data associated with the exposure cycle of the imaging element 201 may be available. In this case, the body control unit 203 selects wobbling enable/disable data associated with a wobbling frequency higher than and most similar to the wobbling frequency associated with the exposure cycle of the imaging element 201.

After selecting the wobbling enable/disable data, the body control unit 203 determines whether wobbling can be executed or not (Step S104). If the wobbling enable/disable data is 1 in Step S104, the body control unit 203 determines that wobbling can be executed (Step S105). If the wobbling enable/disable data is 0 in Step S104, the body control unit 203 determines that wobbling cannot be executed (Step S106).

How the focus control (AF) is executed in this embodiment will be explained. First, how the AF process proceeds in normal state will be explained with reference to FIG. 3.

Figure 3:
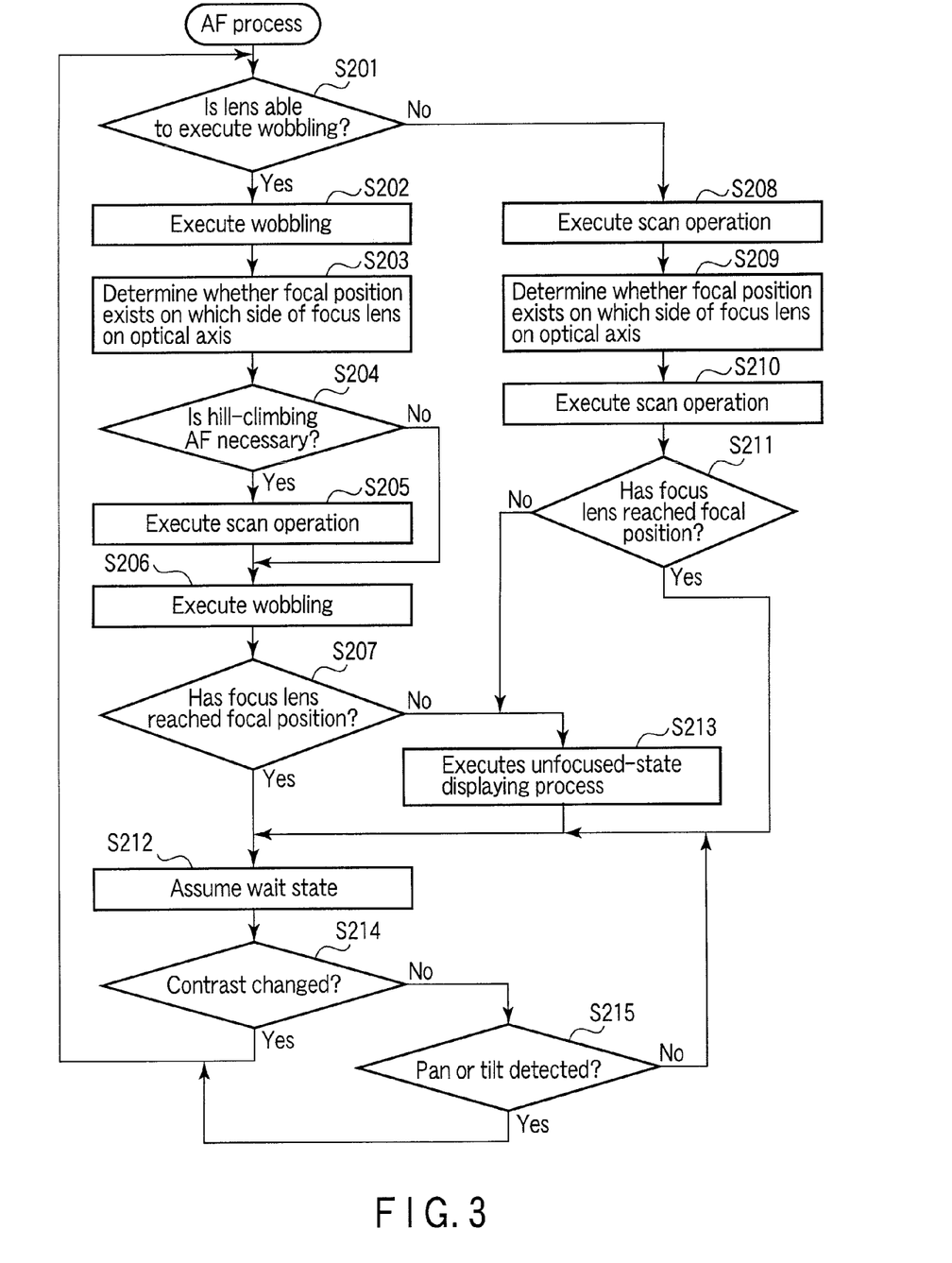
FIG. 3 is a flowchart showing the AF process executed in the embodiment during the ordinary use of the focus control apparatus.

After the AF process has been started, the body control unit 203 determines whether the exchangeable lens 100 is one that can achieve wobbling or not, in accordance with whether wobbling can be executed or not (Step S201).

In Step S201, it may be determined that the exchangeable lens 100 is one that can achieve wobbling. In this case, the body control unit 203 instructs the lens control unit 103 to execute wobbling. As a result, the lens control unit 103 minutely vibrates the focus lens along its optical axis, gradually moving the focus lens to the focal position (Step S202). The wobbling is a known technique and disclosed in, for example, U.S. Patent Application Publication No. 2009/0256950 and U.S. Patent Application Publication No. 2009/0262235. Therefore, it will not be described herein in detail. Note that the exposure cycle which the imaging element 201 has during the wobbling is the prescribed exposure cycle shown in FIG. 2.

After the wobbling has been started, the body control unit 203 determines whether the focal position exists on which side of the focus lens on the optical axis thereof, from the change of the AF evaluation value (i.e., contrast) resulting from the minute vibration of the focus lens. In other words, the body control unit 203 determines whether the AF evaluation value has been increased when the focus lens moves to infinity side (Step S203).

Next, the body control unit 203 determines whether hill-climbing AF needs to be executed (Step S204). In Step S204, the hill-climbing AF is considered necessary if the wobbling alone cannot achieve the focus control with respect to the object because the focal position of the imaging lens 101, for example, deviates greatly. Note that the focal position of the imaging lens 101 may deviate so much if the AF evaluation value is smaller than a prescribed value.

If the hill-climbing AF is found necessary in Step S204, the body control unit 203 instructs the lens control unit 103 to execute a scan operation, moving the focus lens, little by little, toward the focal position (Step S205). As long as the exchangeable lens 100 that can execute wobbling remains attached to the camera body 200, the scan operation is executed on the focus lens until the AF evaluation value is near its peak. The wobbling is executed for moving the focus lens finally to the focal position. The focal position is the focus lens position corresponding to the peak of AF evaluation value. This is why the body control unit 203 causes the imaging element 201 to repeat imaging, acquiring an AF evaluation value at every imaging, thereby detecting how the AF evaluation value changes during the scan operation. For example, the body control unit 203 instructs the lens control unit 103 to stop the scan operation when the AF evaluation value increases to a particular amount, almost reaching the peak. After the scan operation has been stopped, the body control unit 203 instructs the lens control unit 103 to execute wobbling (Step S206).

After the wobbling, the body control unit 203 determines whether the focus lens has reached the focal position, or whether the AF evaluation value has reached the peak (Step S207). If the focus lens is found, in Step S207, to have reached the focal position, the body control unit 203 goes to Step S212. If the focus lens is not found, in Step S207, to have reached the focal position, the body control unit 203 goes to Step S213.

In Step S201, it may be determined that the exchangeable lens 100 is one that cannot achieve wobbling. In this case, the focus control achieved by the wobbling (Steps S202 to S207)

cannot be accomplished. The body control unit 203 therefore executes the hill-climbing AF only. To this end, the body control unit 203 instructs the lens control unit 103 to execute the scan operation, thereby moving the focus lens by a short distance (Step S208). The body control unit 203 then determines the direction of the focal position from the result of the scan operation (Step S209). Thereafter, the body control unit 203 sends instructions to the lens control unit 103, thereby making the lens control unit 103 execute the hill-climbing AF (Step S210). After the hill-climbing AF has been executed, the body control unit 203 determines whether the focus lens has reached the focal position, or whether the AF evaluation value has exceeded the peak (Step S211). If the AF evaluation value has exceeded the peak in Step S211, the body control unit 203 goes to Step S212. If the AF evaluation value has not exceeded the peak in Step S211, the body control unit 203 goes to Step S213.

If the focus lens is found to have reached the focal position, in Step S207 or Step S211, the body control unit 203 assumes a wait state (Step S212). If the focus lens is not found to have reached the focal position, in Step S207 or Step S211, the body control unit 203 executes an unfocused-state displaying process (Step S213). The unfocused-state displaying process is to cause the liquid crystal display unit 202 to display a message informing that the focusing has not been accomplished. Then, the body control unit 203 assumes the wait state in Step S212.

In the wait state, the body control unit 203 determines whether the contrast has changed or not (Step S214). The body control unit 203 compares the present AF evaluation value with the AF evaluation value acquired before it assumes the wait state. If the difference between these values compared exceeds a prescribed value, the body control unit 203 determines that the contrast has changed. If the contrast is not found to have changed in Step S214, the body control unit 203 determines whether the camera body 200 has been panned or tilted (Step S215). If the camera body 200 has not been panned or tilted in Step S215, the body control unit 203 keeps assuming the wait state. If the camera body 200 has been panned or tilted in Step S215, the process returns to Step S201. In this case, the body control unit 203 executes the focus control again.

Figure 4:
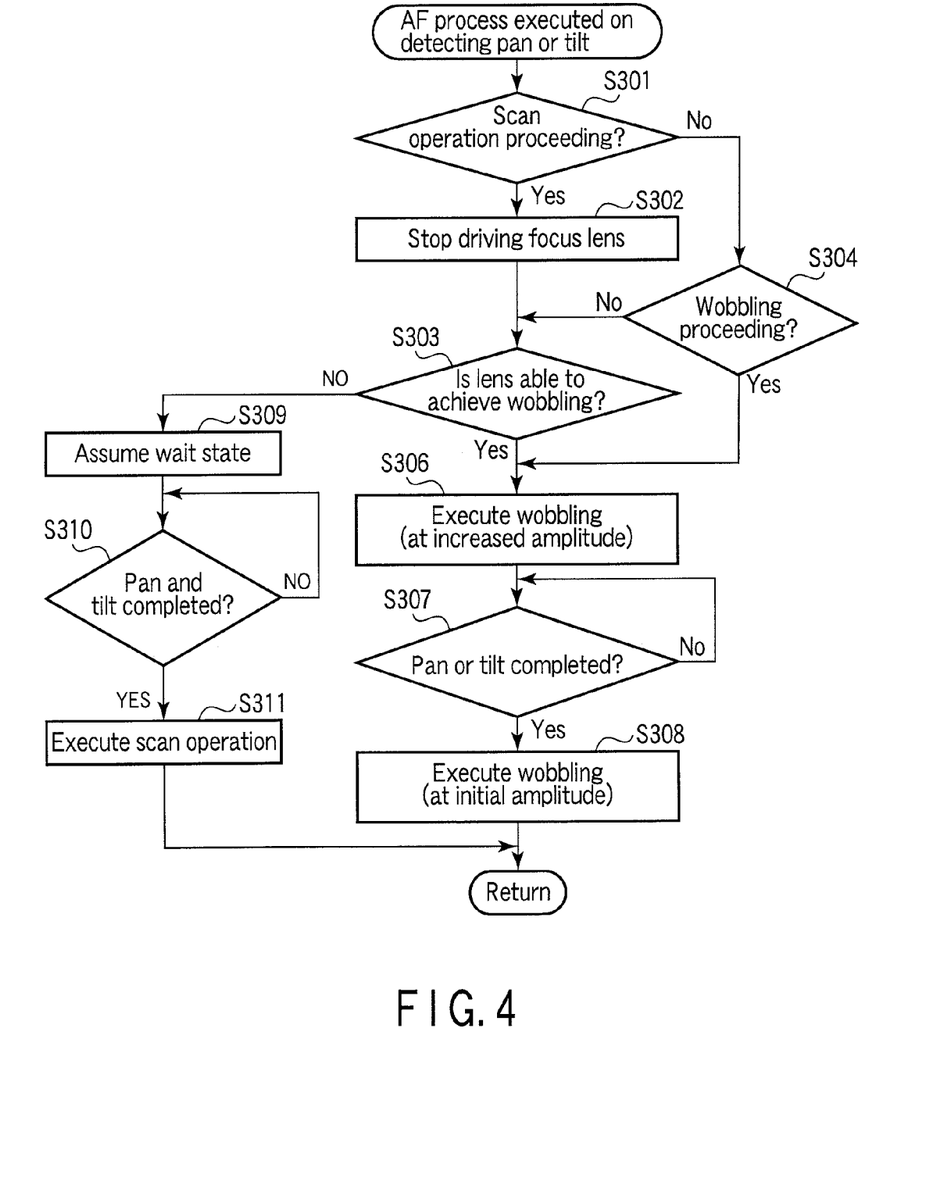
FIG. 4 is a flowchart showing how the AF process executed when a pan or a tilt is detected in the embodiment.

Assume that the camera body 200 greatly changes in orientation. Then, it may be greatly out of focus even if the contrast has not changed at all. In this case, the body control unit 203 needs to leave the wait state. In this regard, how the AF process is executed on detecting pan or tilt as the camera body 200 greatly changes in orientation will be explained with reference to FIG. 4. The process of FIG. 4 is executed by interrupting the process of FIG. 3 if the camera body 200 is found to have been panned or tilted during the process of FIG. 3. In this embodiment, either pan or tilt is found to have been started if either of the following conditions is satisfied.

(Condition 1): abs($x$)≧pan•tilt start threshold Th/focal distance of imaging lens 101

(Condition 2): abs($y$)≧pan•tilt start threshold Th/focal distance of imaging lens 101     (Equation 1)

In Equation 1, abs(x) is the magnitude of the angular velocity (absolute value) detected by the gyro-sensor 205 with respect to the X-axis direction, and abs(y) is the magnitude of the angular velocity (absolute value) detected by the gyro-sensor 205 with respect to the Y-axis direction. The focal distance of imaging lens 101 is the focal distance in the entire optical system that constitutes the imaging lens 101.

The threshold value Th is divided by the focal distance of the imaging lens 101, in order to normalize the threshold value Th with the focal distance. The pan•tilt start threshold value Th is altered in accordance with whether the AF process is executed to record a moving picture or any other picture (e.g., still picture). While a moving picture is being recorded, the pan•tilt start threshold value Th is, for example, about 3.0. While a picture of any other type is being recorded, the lens can be driven as long as the image the liquid crystal display unit 202 displays is clear enough. The pan•tilt start threshold value Th is therefore set to a value smaller than 3.0, for example about 1.0. This makes it easy to determine whether the panning or tilting of the camera body 200 has been started, enhancing the operating readiness of the body control unit 203 with respect to the object. Whether a moving picture is being recorded or not is determined from, for example, the operating mode of the camera body 200. The operating mode of the camera body 200 is set by, for example, the user of the imaging apparatus.

In the instance described above, the pan•tilt start threshold value Th is set to about 1.0 to record any picture other than a moving picture. In practice, however, the pan•tilt start threshold value Th should better be set to about 3.0 (Th=approx. 3.0) as in recording moving pictures, if the focus lens is working in the scan operation.

Figure 7:
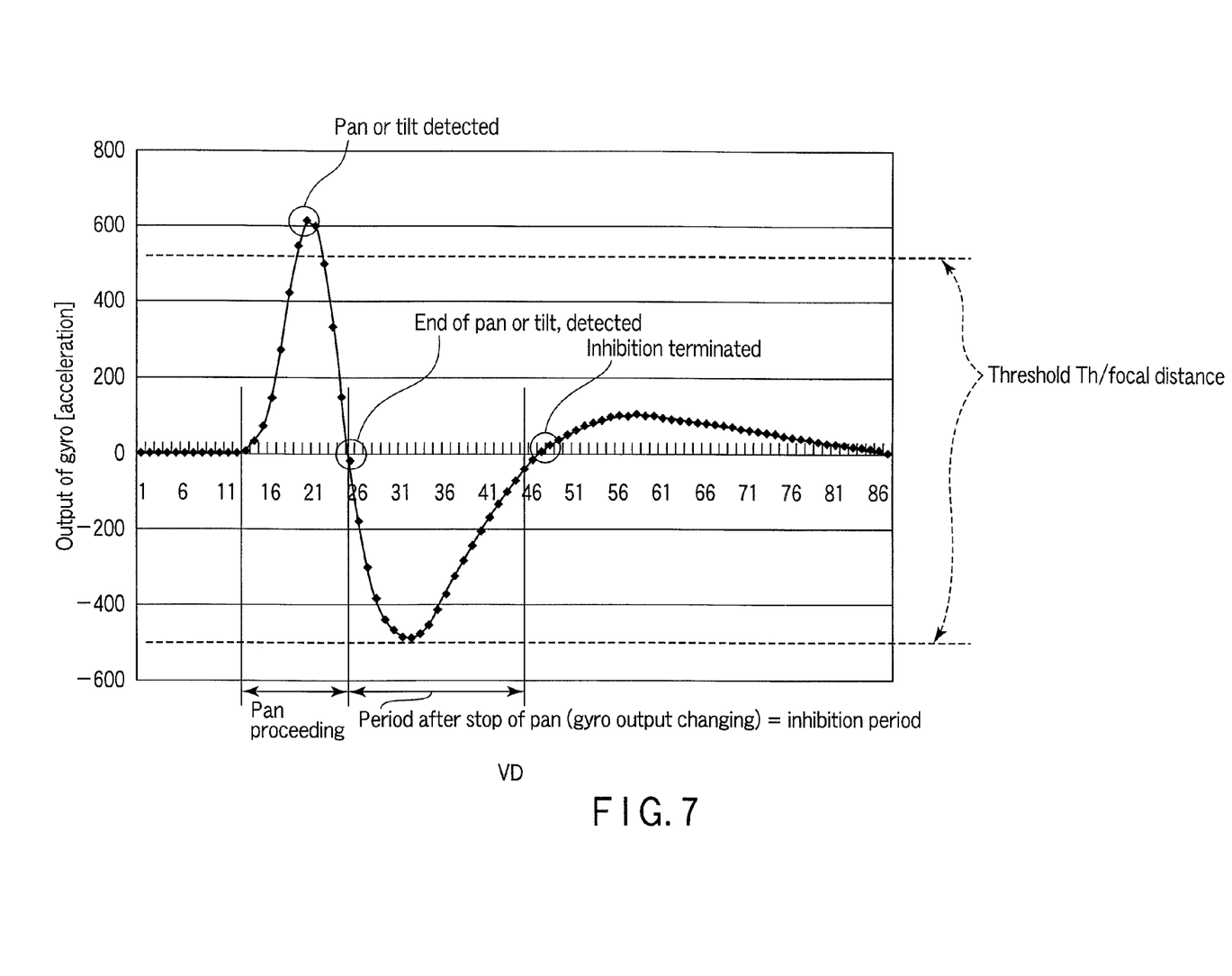
FIG. 7 is a diagram showing an exemplary output waveform of the detection circuit incorporated in the focus control apparatus.

In this embodiment, the detection circuit 206 first executes quadratic differentiation (e.g., high-pass filtering, HPF) on, for example, the angular velocity signal output from the gyro-sensor 205, and then integrates the outputs of the gyro-sensor 205, and executes HPF again. In this case, the output of the detection circuit 206 has such a waveform as shown in FIG. 7, which represents acceleration.

If Condition 1 or Condition 2, specified above, is satisfied, the process of FIG. 4 is executed. In the process, the body control unit 203 first determines whether the focus lens is now working for the scan operation (Step S301). If the focus lens is working for the scan operation, the body control unit 203 sends instructions to the lens control unit 103, causing the same to stop driving the focus lens, for some time (Step S302). Thereafter, the body control unit 203 determines whether the exchangeable lens 100 is one that can achieve wobbling, from the result of the wobbling enable/disable determination process (Step S303). If the focus lens is found, in Step S301, not working for the scan operation, the body control unit 203 determines whether the focus lens is working for wobbling (Step S304). If the focus lens is not working for wobbling in Step S304, the body control unit 203 goes to Step S306.

If the exchangeable lens 100 is one that can achieve wobbling the focus lens in Step S303 or if the focus lens is working for wobbling in Step S304, the body control unit 203 sends instructions to the lens control unit 103, causing the same to execute wobbling at an amplitude larger than in the AF process proceeding in normal state as shown in FIG. 3 (Step S306). This is because the image much blurs while the camera body 200 is being panned or tilted, and changes (due to change in the lens position or view angle) only a little by the minute vibration of the focus lens even if the wobbling amplitude is increased. The vibration amplitude is increased to, for example, about 1.5 times the normal value. Nonetheless, it may be increase more than 1.5 times if the pan or tilt is relatively large.

After the wobbling is started in Step S306, the body control unit 203 determines whether the pan or tilt has been completed (Step S307). More precisely, either pan or tilt is found to have been completed if either of the following conditions is satisfied.

(Condition 1): abs(DetAxis)<0.3×pan•tilt start threshold Th/focal distance of imaging lens 101

(Condition 2): The sign of abs(DetAxis) is inverted from the sign it had when the pan or tilt was started             (Equation 2)

In Equation 2, abs(DetAxis) is the angular velocity detected by the gyro-sensor 205 with respect to the axis direction when the pan or tilt was found to start. Note that the coefficient 0.3 can be changed if necessary.

If the pan or tilt is found completed, in Step S307, the body control unit 203 sends instructions to the control unit 103, causing the same to execute wobbling at the same amplitude as in the AF process proceeding in normal state as shown in FIG. 3 (Step S308). This is because the vibration of the focus lens will influence the image displayed, unless the wobbling amplitude is reduced after the pan or tilt has completed.

If the focus lens is found to have reached the focal position in the wobbling executed in Step S306 or Step S308, the body control unit 203 assumes the wait state in Step S212 shown in FIG. 3. In the wobbling executed in Step S308, the scan operation may need to be executed because the focal position, for example, much deviates from the position the focus lens takes at present. In this case, it is desirable to execute a scan operation as in Steps S205 to S207 shown in FIG. 3.

If the exchangeable lens 100 is one that can achieve wobbling the focus lens in Step S303, the body control unit 203 assumes the wait state (Step S309). This is because if the scan operation is executed while the camera body 200 is panned or tilted, the AF evaluation value may be erroneously found to have reached its peak due to, for example, a contrast changed resulting from the change of the object. In the wait state, the body control unit 203 determines whether the pan and tilt have completed or not (Step S310). If the pan and tilt are found not completed in Step S310, the body control unit 203 remains in the wait state. If the pan and tilt are found completed in Step S310, the body control unit 203 sends instructions to the control unit 103, causing the same to execute the scan operation to accomplish hill-climbing AF (Step S311). If the hill-climbing AF brings the focus lens into the focused state, the body control unit 203 assumes the wait state in Step S212 shown in FIG. 3.

Figure 5:
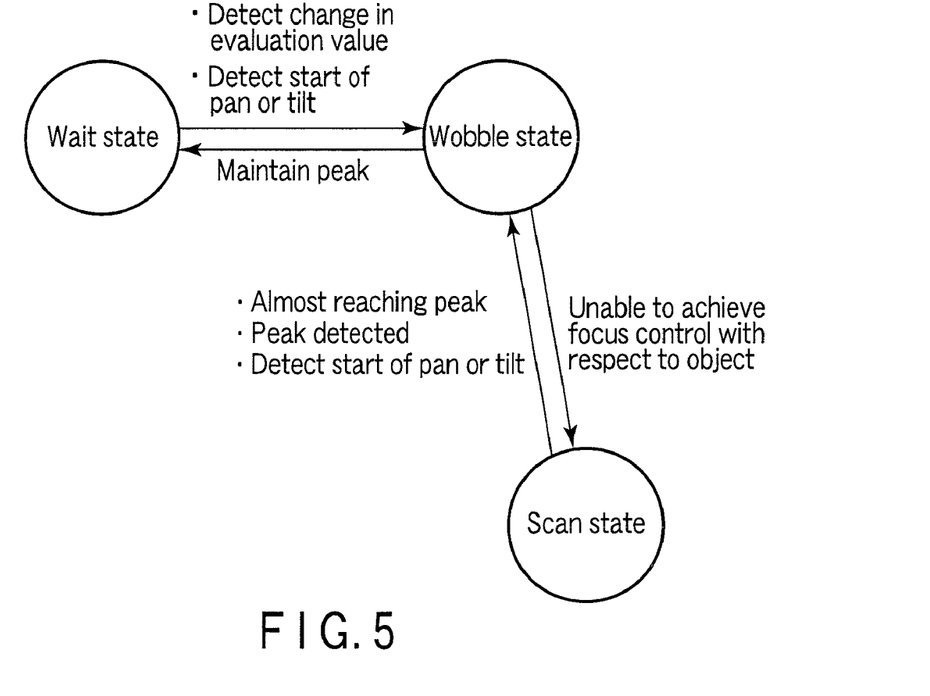
FIG. 5 is a transition diagram showing how the AF process proceeds if an exchangeable lens capable of achieving wobbling is attached to the camera incorporating the focus control apparatus.
Figure 6:
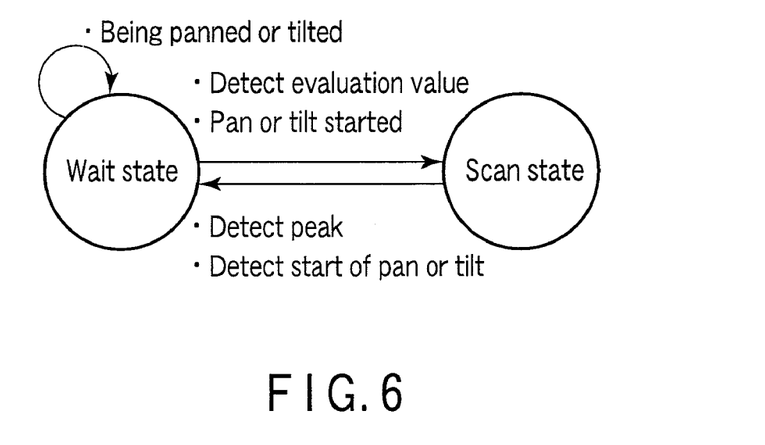
FIG. 6 is a transition diagram showing how the AF process proceeds if an exchangeable lens incapable of achieving wobbling is attached to the camera incorporating the focus control apparatus.

The AF process, which has been explained with reference to FIGS. 3 and 4, proceeds as illustrated in the transition diagrams of FIGS. 5 and 6. FIG. 5 is a transition diagram showing how the AF process proceeds if the exchangeable lens 100 can achieve wobbling. FIG. 6 is a transition diagram showing how the AF process proceeds if the exchangeable lens 100 cannot achieve wobbling.

If the exchangeable lens attached to the imaging apparatus is one that can achieve wobbling, the imaging apparatus operates in any one of three states in the AF process, i.e., wobble state, scan state and wait state. While the focus lens remains in the focused state, the imaging apparatus stays in the wait state. If a change in the AF evaluation value (i.e., contrast) is detected or the start of panning or tilting is started while the imaging apparatus stays in the wait state, the state of the imaging apparatus transits to the wobble state, whereby the wobbling is executed (Step S202 shown in FIG. 3, and Step S306 show in FIG. 4). The imaging apparatus transits from the wobble state to the scan state if the focal position is so much deviate that the wobbling alone cannot achieve the focus control with respect to the object (Step S205 shown in FIG. 3). If the AF evaluation value almost reaches the peak, if bringing the focus lens to the focal position is executed, or if the pan or tilt is found to have started, the imaging apparatus transits to the wobble state (Step S206 shown in FIG. 3, and Step S306 shown in FIG. 4). At the time the AF evaluation value reaches the peak, the imaging apparatus transits to the wait state (Step S212 shown in FIG. 3.)

If the exchangeable lens attached to the imaging apparatus is one that cannot achieve wobbling, the imaging apparatus operates in either of two states in the AF process, i.e., scan state and wait state. While the focus lens remains in, for example, the focused state, the imaging apparatus stays in the wait state. If a change in the AF evaluation value (i.e., contrast) is detected while the imaging apparatus stays in the wait state, the state of the imaging apparatus transits to the scan state (Step S208 shown in FIG. 3 and Step S311 show in FIG. 4). If the AF evaluation value reaches the peak during the scan operation or if the pan or tilt is found to have started, the imaging apparatus transits to the wait state (Step S212 shown in FIG. 3, and Step S309 shown in FIG. 4). In this case, the imaging apparatus remains in the wait state as long as the pan or tilt goes on.

The inhibition of a pan•tilt start decision will be explained with reference to FIG. 7. FIG. 7 is a diagram showing an exemplary output waveform of the detection circuit 206 according to this embodiment. As mentioned above, the output of the detection circuit 206 has such a waveform as shown in FIG. 7, which represents acceleration. As seen from FIG. 7, even after the pan or tilt has been terminated, the output of the gyro-sensor 205 greatly changes in reverse direction during a period (inhibition period). Hence, neither the pan nor the tilt is detected during an inhibition period that satisfies the following conditions. During the inhibition period, the start decision is inhibited in the direction of only the axis on which either pan or tilt has been started.

(Condition): The time elapsing after the pan or tilt has been terminated is equal to or shorter than a prescribed time, and the sign of abs(DetAxis) remains reverted since the pan or tilt was started.

Even in the inhibition period, the pan or tilt is determined to have started if the following condition is satisfied:

(Condition): abs(DetAxis at present)≧max{abs(DetAxis, from the start to end of the pan or tilt)}

Here, abs(DetAxis at present) is the output at present from the gyro-sensor 205, and max{abs(DetAxis, from the start to end of the pan or tilt)} is the absolute maximum value the gyro-sensor 205 has output during a VD period, i.e., from the start of time when the pan or tilt to the end thereof. The VD period is the duration of the sync signal represented by the horizontal axis of FIG. 7.

As has been described, whether the focus lens of the exchangeable lens 100 can achieve wobbling is determines in this embodiment. If the exchangeable lens 100 can achieve wobbling, the focus control is executed in one way. If the exchangeable lens 100 cannot achieve wobbling, the focus control is executed in the other way. More specifically, the focus control is executed, utilizing the wobbling, if the pan or tilt of the camera body 200 has been detected and if the exchangeable lens 100 can achieve wobbling. Even if the pan or tilt of the camera body 200 has been detected, the focus control is not executed until the pan or tilt of the camera body 200 is found to have completed. Thus, the focus control can be executed with high precision even while the camera body 200 is being panned or tilted, if the exchangeable lens 100 attached to the camera body 200 can achieve wobbling. Further, if the exchangeable lens 100 attached to the camera body 200 can achieve wobbling, the AF evaluation value is prevented from being erroneously detected to have reached its peak while the camera body 200 is panned or tilted.

Even if the pan or tilt of the camera body 200 is detected to have started during the wobbling, the focus lens remains driven. This can accomplish a high-speed focus control.

In the embodiment described above, an angular velocity sensor is used. An acceleration sensor may be used, instead. Alternatively, an angular velocity sensor may be utilized, together with an acceleration sensor for accomplishing image stabilization. In this case, however, both power and a control signal need to be supplied to the angular velocity sensor during the AF process even if the image stabilization is invalidated.

The angular velocity sensor or the acceleration sensor may be incorporated in the exchangeable lens 100. If this is the case, the output of the detection circuit may be input to the body control unit 203 through the mount contact 204.

A modified configuration that the pan•tilt detection unit may have will be described. This modification detects a pan or a tilt uses by utilizing a motion vector, instead of an angular velocity sensor (gyro).

A motion vector is obtained in the following process. First, the imaging element 201 repeats imaging, generating images of an object. Next, the position that an image of interest observed in the present frame assumed in the preceding frame is determined by means of, for example, template matching. Then, the distance by which the image of interest has moved and the direction in which it has moved are calculated.

Figure 8A:
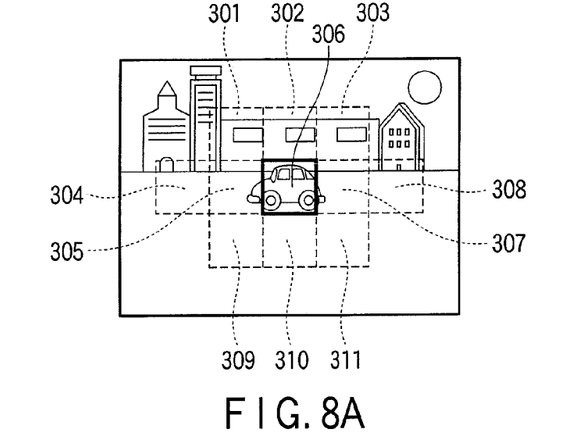
FIG. 8A, FIG. 8B and FIG. 8C are diagrams explaining a process of detecting a major object by means of template matching and then acquiring a motion vector.
Figure 8B:
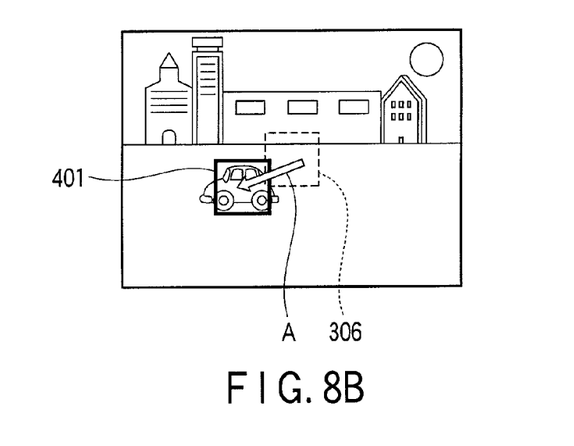
Figure 8C:
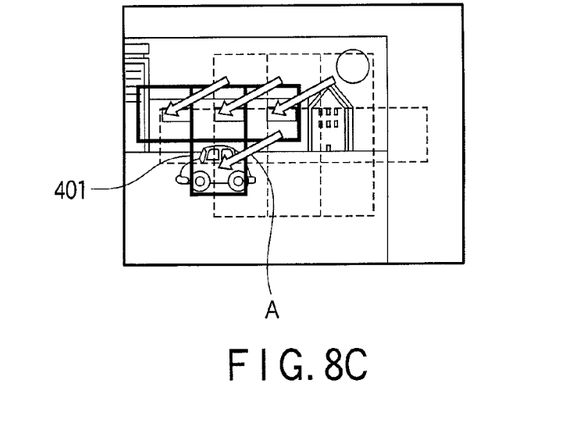

FIG. 8A, FIG. 8B and FIG. 8C are diagrams explaining a process of detecting a major object by means of template matching and then acquiring a motion vector. Motion vectors are simultaneously detected, respectively at a plurality of parts of the image, such as AF target areas. If the motion vectors detected in the parts of the image are similar, the camera is found to be panned or tilted.

As shown in FIG. 8A, AF target areas 301 to 311 are set to a template for detecting motion vectors. Assume that the image in one AF target area 306 is designated as image of interest. Then, the motion vector is defined by the distance and direction which the image of interest moves as the frame is switched from the (n−1)th frame to the nth frame. More precisely, the image of interest may exist in AF target area 306 of the (n−1)th frame as shown in FIG. 8A, and may exist at position 401 in the nth frame shown in FIG. 8B. In this case, the motion vector is indicated by arrow A in FIG. 8B. As shown in FIG. 8C, other motion vectors are calculated for other AF target areas.

A method of determining the start of pan or tilt, by using the motion vector calculated as shown in FIG. 8C, will be explained below.

Either a pan or a tilt is assumed to have occurred, if either of the following conditions is satisfied.

(Condition 1): abs(motion vector [X])≧pan•tilt start decision threshold Thb/focal distance of imaging lens (Condition 2): abs(motion vector [Y])≧pan•tilt start decision threshold Thb/focal distance of imaging lens.

Here, X and Y are X-axis component and Y-axis component of an averaged motion vector calculated for a plurality of AF target areas, and abs( ) indicates absolute value.

In the right side of either equation, the pan•tilt start decision threshold Thb is divided by the focal distance of the imaging lens. That is, the threshold Thb is normalized with the focal distance. A pan or a tilt can therefore be detected, irrespective of the focal distance of the imaging lens.

Alternatively, either a pan or a tilt is assumed to have ended, if either of the following conditions is satisfied.

(Condition 1): abs(motion vector [X])<pan•tilt start decision threshold Thb×0.7/focal distance of imaging lens (Condition 2): abs(motion vector [Y])<pan•tilt start decision threshold Thb×0.7/focal distance of imaging lens.

Here, 0.7 is a coefficient that can be appropriately changed, as needed.

Figure 9:
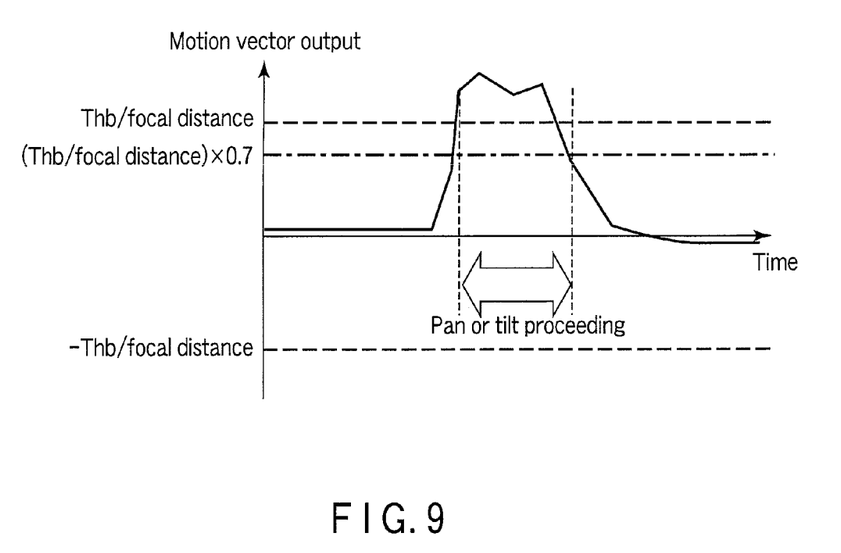
FIG. 9 is a diagram showing how a motion vector output changes with time, and specifying a period during which both a pan and a tilt seem occurring.

FIG. 9 shows how a motion vector output changes with time, and specifies a period during which both a pan and a tilt seem occurring. In FIG. 9, three broken line and a one chain line define a region, in which either a pan or a tilt is found occurring.

If a pan•tilt start decision or a pan•tilt end decision is made based on the motion vector, for a plurality of AF target areas, it is determined that the panning or tilting of the camera has been started or ended.

The pan•tilt detection can thus be accomplished without using a special sensor such as an angular velocity sensor or an acceleration sensor. The pan•tilt detection utilizing a motion vector is therefore advantageous in term of cost involved.

The pan•tilt detection may be executed by using both a motion vector and an angular velocity sensor, or by weighting the motion vector and the output of the angular velocity sensor. In this case, the pan or tilt of the camera can be detected more accurately.

Moreover, the present embodiment can execute the following controls.

The pan•tilt detection utilizing an angular velocity sensor (gyro) cannot detect an unstable state the object may assume as it moves vertically and horizontally, as long as the camera remains fixed in orientation.

By contrast, if a motion vector is used as described above, such an unstable state of the object can be detected even if the camera remains fixed in terms of orientation.

Instead of Step S215 (FIG. 3) of determining whether pan or tilt has been detected, whether the object assumes an unstable state may be determined from the motion vector. Further, instead of Step S307 (FIG. 4) of determining whether the pan or tilt has been completed, whether the object no longer assumes an unstable state may be determined from the motion vector. Then, a high-precision focus control can be achieved even if the object assumes an unstable state, so long as the exchangeable lens can achieve wobbling.

Furthermore, instead of Step S310 (FIG. 4) of determining whether the pan and tilt have completed, whether the object has left the unstable state may be determined from the motion vector. In this case, the AF evaluation value is prevented from being erroneously detected to have reached its peak while the object remains in an unstable state, even if the exchangeable lens cannot achieve wobbling.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A focus control apparatus for use in an imaging apparatus comprising an exchangeable lens and a camera body, the exchangeable lens including an optical system including a focus lens capable of moving in an optical axis and configured to generate an optical image of an object, and the camera body being able to hold the exchangeable lens and including an imaging element configured to generate an image data from the optical image generated by the optical system, the apparatus comprising:

a pan•tilt detection unit configured to detect a pan and tilt of the camera body;

a decision unit configured to determine whether the exchangeable lens is able to achieve wobbling; and a control unit configured to control an automatic focusing process of moving the focus lens to achieve focus control with respect to the object, in accordance with the image data generated by the imaging element, wherein if the exchangeable lens is found able to achieve wobbling, when the pan or tilt of the camera body is detected to have started, the control unit controls the automatic focusing process by utilizing wobbling of larger amplitude than in the case where neither the pan nor tilt of the camera body is detected.

2. The focus control apparatus according to claim 1, wherein after the pan•tilt detection unit detects that the pan or tilt of the camera body has been stopped, the control unit controls the automatic focusing process by utilizing wobbling of an initial wobbling amplitude.

3. The focus control apparatus according to claim 1, wherein the pan•tilt detection unit detects an angular velocity resulting from motion of the camera body, and determines that the camera body is moving if the angular velocity exceeds a threshold value.

4. The focus control apparatus according to claim 3, wherein the pan•tilt detection unit uses, as the threshold value, a value obtained by dividing a prescribed value by a focal distance of the exchangeable lens.

5. The focus control apparatus according to claim 3, wherein the camera body is configured to record a moving picture, and the threshold value is larger in a period a moving picture is recorded, than in any other period.

6. The focus control apparatus according to claim 1, wherein the pan•tilt detection unit detects, from the image data, a motion vector generated as the camera body moves, and determines that the camera body is moving if the motion vector exceeds a threshold value.

7. A focus control apparatus for use in an imaging apparatus comprising an exchangeable lens and a camera body, the exchangeable lens including an optical system including a focus lens capable of moving in an optical axis and configured to generate an optical image of an object, and the camera body being able to hold the exchangeable lens and including an imaging element configured to generate an image data from the optical image generated by the optical system, the apparatus comprising:

a pan•tilt detection unit configured to detect a pan and tilt of the camera body;

a decision unit configured to determine whether the exchangeable lens is able to achieve wobbling; and a control unit configured to control an automatic focusing process of moving the focus lens to achieve focus control with respect to the object, in accordance with the image data generated by the imaging element, wherein the control unit first stops the exchangeable lens and then causes the focus lens to start wobbling, if the pan or tilt of the camera body is detected to have started while the focus lens is moving and if the exchangeable lens is determined to be able to achieve wobbling.

8. The focus control apparatus according to claim 7, wherein the control unit controls the automatic focusing process by utilizing wobbling of larger amplitude than in the case where neither the pan nor tilt of the camera body is detected.

9. The focus control apparatus according to claim 8, wherein after the pan•tilt detection unit has detects that the pan or tilt of the camera body has been stopped, the control unit controls the automatic focusing process by utilizing wobbling of an initial wobbling amplitude.

10. The focus control apparatus according to claim 7, wherein the pan•tilt detection unit detects an angular velocity resulting from motion of the camera body, and determines that the camera body is moving if the angular velocity exceeds a threshold value.

11. The focus control apparatus according to claim 10, wherein the pan•tilt detection unit uses, as the threshold value, a value obtained by, dividing a prescribed value by a focal distance of the exchangeable lens.

12. The focus control apparatus according to claim 10, wherein the camera body is configured to record a moving picture, and the threshold value is larger in a period a moving picture is recorded, than in any other period.

13. The focus control apparatus according to claim 7, wherein the pan•tilt detection unit detects, from the image data, a motion vector generated as the camera body moves, and determines that the camera body is moving if the motion vector exceeds a threshold value.

14. A focus control method for use in an image apparatus comprising an exchangeable lens and a camera body, the exchangeable lens including an optical system including a focus lens capable of moving in an optical axis and configured to generate an optical image of an object, and the camera body being able to hold the exchangeable lens and including an imaging element configured to generate image data from the optical image generated by the optical system, the method comprising:

detecting a pan and tilt of the camera body;

determining whether the exchangeable lens is able to achieve wobbling; and executing an automatic focusing process of moving the focus lens to achieve focus control with respect to the object, in accordance with the image data generated by the imaging element, wherein if the exchangeable lens is found able to achieve wobbling, when the pan or tilt of the camera body is detected to have started, executing the automatic focusing process by utilizing wobbling of larger amplitude than in the case where neither the pan nor tilt of the camera body is detected.

15. The focus control method according to claim 14, wherein after detecting that the pan or tilt of the camera body has been stopped, the method further comprises executing the automatic focusing process by utilizing wobbling of an initial wobbling amplitude.

16. The focus control method according to claim 14, further comprising detecting an angular velocity resulting from motion of the camera body, and determining that the camera body is moving if the angular velocity exceeds a threshold value.

17. The focus control method according to claim 16, further comprising using, as the threshold value, a value obtained by dividing a prescribed value by a focal distance of the exchangeable lens.

18. The focus control method according to claim 16, wherein the camera body is configured to record a moving picture, and the threshold value is larger in a period moving picture is recorded, than in any other period.

19. The focus control method according to claim 14, further comprising detecting, from the image data, a motion vector generated as the camera body moves, and determining that the camera body is moving if the motion vector exceeds a threshold value.

\* \* \* \* \*